United States Patent [19]

Carlino

[11] Patent Number: 4,850,637
[45] Date of Patent: Jul. 25, 1989

[54] WINDBREAKER FOR A CONVERTIBLE AUTOMOBILE

[76] Inventor: Charles Carlino, c/o Lorin Systems, Inc., 66 Pearl St. (Suite 303), New York, N.Y. 10004

[21] Appl. No.: 171,558

[22] Filed: Mar. 22, 1988

Related U.S. Application Data

[63] Continuation-in-part of Ser. No. 79,099, Jul. 29, 1987, abandoned.

[51] Int. Cl.⁴ .............................................. B62D 25/00
[52] U.S. Cl. .................................. 296/180.1; 296/107
[58] Field of Search ............... 296/15, 217, 91, 180.1, 296/107, 136, 85

[56] References Cited

U.S. PATENT DOCUMENTS 4,761,030  8/1988  Boykin .................................. 296/15

FOREIGN PATENT DOCUMENTS 0233777  2/1987  European Pat. Off. ............. 296/15
2182010  5/1987  United Kingdom ................. 296/15

Primary Examiner—James B. Marbert
Attorney, Agent, or Firm—Edwin D. Schindler

[57] ABSTRACT

A windbreaker for a convertible automobile is disclosed. The windbreaker, which is designed to reduce wind within the passenger compartment of a convertible automobile when the automobile is in motion, is preferably detachably detached to bucket seats or a bench seat with strap means. Such strap means include, for example, strip means for wrapping around a portion of the bucket or bench seats of an automobile. Such strap means also include the use of Velcro to affix such strap means. Other means for securing the windbreaker surface are also disclosed.

29 Claims, 4 Drawing Sheets

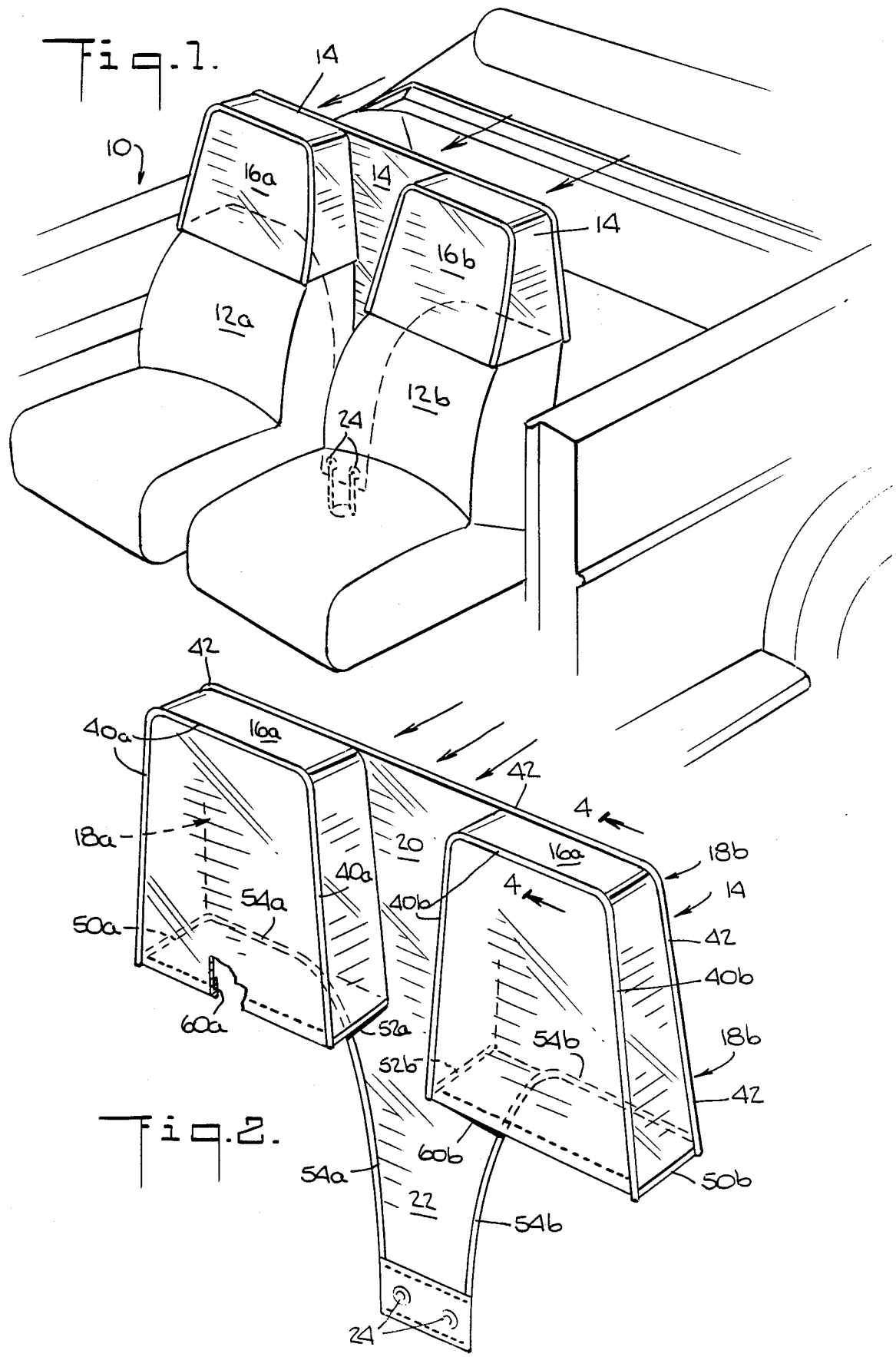

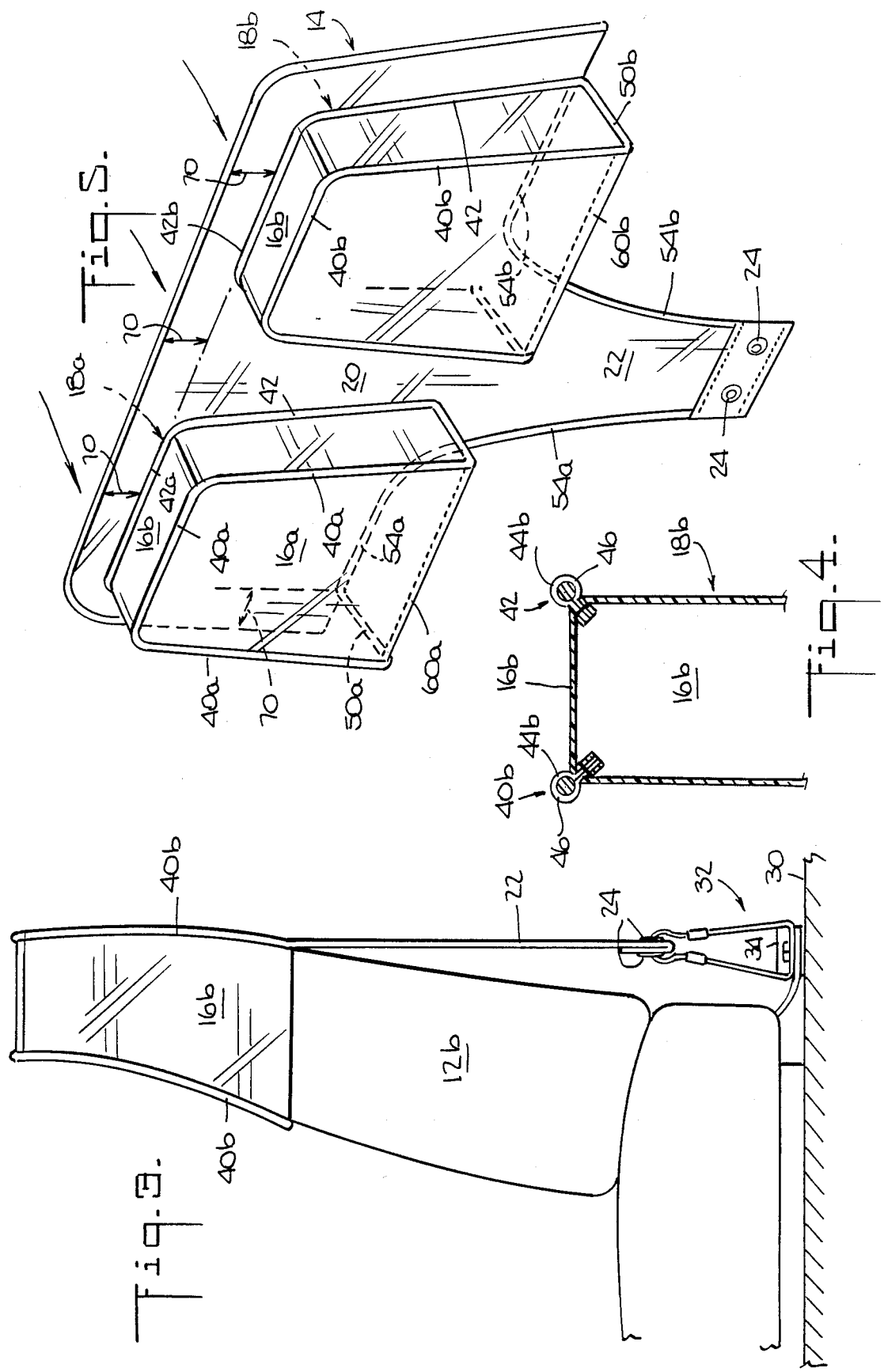

ated Sept. 3, 1985, to Lobo

WINDBREAKER FOR A CONVERTIBLE AUTOMOBILE

This application is a continuation-in-part application of application Ser. No. 07/079,099, filed July 29, 1987, now abandoned.

BACKGROUND OF THE INVENTION

The present invention relates to a windbreaker for a convertible automobile. More particularly, the present invention concerns a windbreaker which is designed to inhibit rear-to-forward directional winds present during the operation of a convertible automobile.

It is a well known problem to drivers of convertible automobiles that during operation of such a car, strong and continuous winds, proportional to the speed at which the automobile is moving, exist within the passenger compartment. Such winds continuously run from the back of the automobile forward to persons in the front seat of the automobile, including the driver. Such winds present an inconvenience and annoyance to passengers of the automobile and, further, could present a safety hazard if the ability of the driver to properly control the automobile is impaired. Such impairment might occur when a driver's hair is blown forward thereby impairing his vision.

The precise cause of such winds is not clearly understood, however, it is postulated that such winds toward the front of the passenger area during movement of the convertible automobile are created by the existence of a slight vacuum or depression in air pressure created on the passenger side of the windshield. This depression in air pressure creates conditions which pull air toward the front of the passenger compartment in an attempt to satisfy the depression. Irrespective, however, of the precise cause of the effect described above, the existence of such a wind effect is well known.

Despite the known existence of this wind effect, little attention has been given to the development of means for overcoming such effect. Among those attempts to develop such a device to overcome the wind effect of convertible automobiles is the draft deflector described in U.S. Pat. No. 4,538,852, issued Sept. 3, 1985, to Lobo et. al. The device described in this reference, however, relies upon incorporating the draft deflector with a cross-bar member of the convertible roof, as well as relying upon the roll bar of the roof to ultimately form the deflector device. Such device is far more complicated to manufacture and install than is desirable and may not easily be detached from the automobile.

SUMMARY OF THE INVENTION

Accordingly, it is an object of the present invention to provide a windbreaker device which reduces or eliminates the effects of the unwanted occurrence, present in convertible automobiles when in motion, of a continuous rear-to-front wind.

It is a further object of the invention to provide a windbreaker device for convertible automobiles which is durable and relatively simple to construct and use.

It is, yet, a further object of the present invention to provide a windbreaker which increases the safety of operating a convertible automobile.

It is an additional object of the invention to proivde a windbreaker for convertible automobiles which is economical to construct.

Accordingly, the foregoing and related objects are achieved by a windbreaker for a convertible automobile which is, preferably, removably affixed to the front and/or back seats of the automobile. In the instance where the front seats of the automobile are bucket seats, which allow considerable winds to pass between the space existing between the bucket seats, the windbreaker is so positioned in the automobile as to prevent wind from passing between the seats.

Specifically, the windbreaker may either be constructed out of a rigid surface material, such as a metal, wood or hard cardboard or, in certain instances, be constructed from a softer material, such as a soft plastic. The use of a plastic material would likely be the most practical in the instance where an automobile had front bucket seats. In this instance, the windbreaker, which may be made of a soft plastic, would preferably be removably attached or fitted to the top, or headrest portion, of each of the bucket seats. A plastic strip, or a strip made of another material, would preferably extend downward from, generally, at least the height of the bucket seats to essentially the floor of the car behind the bucket seats. Such a strip would be at least as wide as the distance existing between the front bucket seats. It should be noted that such a strip should, preferably, be behind the bucket seats, i.e., on the side of the seats which would face passengers traveling in a rear seat, so that the wind blowing from the rear of the car to the front of the car is best blocked from running through the space existing between the front bucket seats.

In an alternative and preferred embodiment of the invention, the windbreaker of the invention is provided with an outwardly extending panel, or "halo," which borders along the top and prevents forward directional winds from reaching the front of the passenger compartment by coming over the tops of the front bench seat, as well as preventing winds from reaching the front portion of the passenger compartment by running between the space existing between the left side of the front seat and the left front car door and the space existing between the right side of the front seat and the right front door.

It should also be pointed out that with respect to the halo embodiment of the invention, which may be used in conjunction with either bucket seats of bench seats, the invention may also be modified for easy attachment to a back car seat, which is usually a bench seat.

BRIEF DESCRIPTION OF THE DRAWING

In the drawing, wherein similar reference numerals denote similar features throughout the several views:

FIG. 1 is a perspective view of the front bucket seats of a convertible automobile, illustrating a preferred embodiment of the invention in relation to said front bucket seats;

FIG. 2 is a perspective view of the embodiment of the present invention shown in FIG. 1 with a portion of the invention broken away to illustrate a preferred construction of a portion of the invention;

FIG. 3 is a side elevational view of a bucket seat showing a possible means of attachment to the automobile floor behind said seat;

FIG. 4 is a cross-sectional view of the top portion of the present invention that illustrates a preferred construction of the present invention taken along the 4—4 line of FIG. 2; and, FIG. 5 is a perspective view of the embodiment of the present invention shown in FIGS. 1 and 2 with the added feature of an outwardly extending panel, or halo, bordering the top and side edges of the invention;

DETAILED DESCRIPTION OF THE DRAWING

Figure 6:
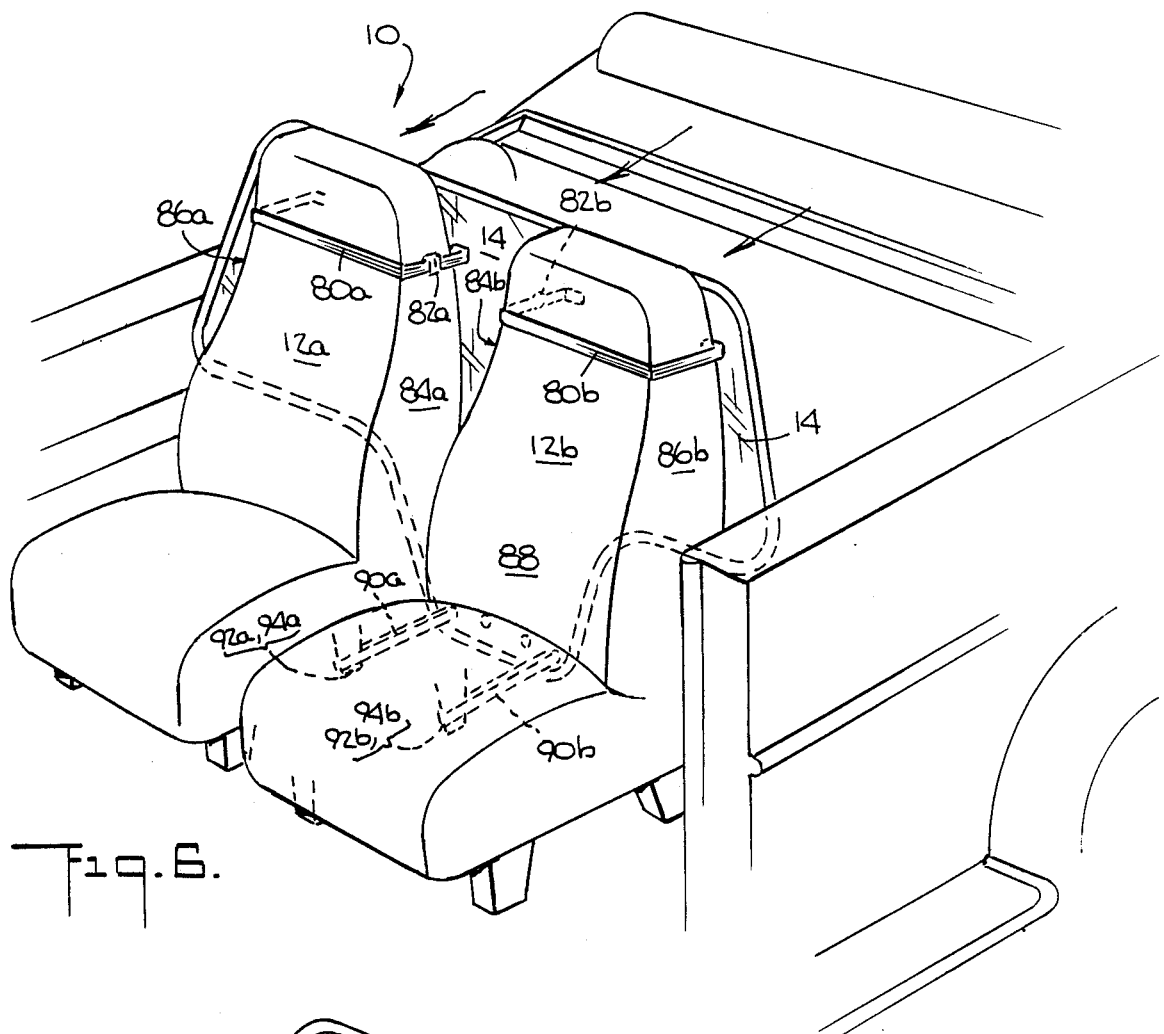
FIG. 6 is a perspective view of an alternative preferred embodiment of the present invention in relation to the front bucket seats of a convertible automobile.

Turning now, in detail, to a description of the drawing, FIG. 1 is a perspective view of a convertible automobile 10 having front bucket seats 12a, 12b with windbreaker 14 of the present invention. The embodiment presented in FIG. 1 of the drawing, and shown apart from seats 12a, 12b in FIG. 2, includes two pocket portions 16a, 16b, which are each capable of being removably attached to the headrest portions of seats 12a, 12b. The securement of pockets 16a, 16b is by an interference fit which is reinforced by gravity. The back surface of each pocket part, which are designated by reference numerals 18a, 18b, should preferably be a unitary segment of material continuously extending from the back portion, or surface, of one pocket to the back surface of the other pocket. In this fashion, an area of surface material designated by the reference numeral 20 exists between the back portions of seats 12a, 12b which is capable of preventing the passage of wind between seats 12a, 12b when the convertible automobile 10 is in motion. Extending from surface 20, as well as back portions 18a, 18b, is strip 22. Strip 22 essentially, as best showin in FIG. 3, extends downward to the automobile floor 30 in roughly the center of the automobile to further prevent winds (designated by unnumbered arrows in the drawing figures) from running between the space between seats 12a, 12b. Finally, extending from strip 22 is a set of grommets, designated by reference numeral 24 which, optionally, may be either permanently or temporarily affixed to a securement means located on the floor of the automobile behind seats 12a, 12b (see, FIG. 3). The precise means for attachment of grommets 24 to floor 30 may be widely varied and may include, for example, a set of straps 32 and a buckle 34.

The precise construction of the inventive windbreaker may be varied, and all such variations are, of course, encompassed within the scope of the present invention. A preferred construction for extra strength and durability is shown in the drawing detailed in the view provided in FIG. 4. FIG. 4 is a cross-sectional view of pocket 16b of windbreaker 14 taken along the 4—4 line of FIG. 2. In this preferred embodiment, the edges of pocket portion 16b, designated by the reference numerals 40b and 42 are wire-type edges, as is commonly employed in the constructional design of automobile seats. Such a design feature prevents excessive wear and tear of such edges, which would likely otherwise occur, over many years and everyday usage. Wire edges 40 and 42 have an outer coat 44 and may, optionally, include an internal structure, or wire portion 46, running through coat 44. Wire portion 46 may either be a metallic wire or a wire made of some other material, if so desired.

Such a wire-type of edge should, preferably, be included along the lower side edges of pocket portions 16a, 16b; such lower edges being designated by the reference numerals 50a, 52a and 50b, 52b. Likewise, such wired-edges may be present along the lower, rear edges of the pocket portions (such lower, rear edges being designated by reference numerals 54a, 54b) and may, preferably, extend along the edges of strip 22 to grommets 24 (see, FIGS. 2 and 5). As an alternative to the use of wired-edges, along the lower edges of pocket portions 16a, 16b, a hemmed-edge construction (60) is possible. In a preferred embodiment of the present invention in FIG. 5, windbreaker 14 is provided with an outwardly extending panel, or "halo," which borders along the back portion of pocket portions 16a, 16b, and is, preferably, an extension of the back surface portions (18a, 20, 18b) of the inventive windbreaker itself. This halo 70 should be made of a rigid material, or otherwise be provided with means for giving it rigidity so that it can resist the force of the winds running toward the front portion of a the passenger compartment of automobile 10. The precise width or height of halo 70 will depend upon the dimensions of the automobile and other considerations of the user.

Figure 7:
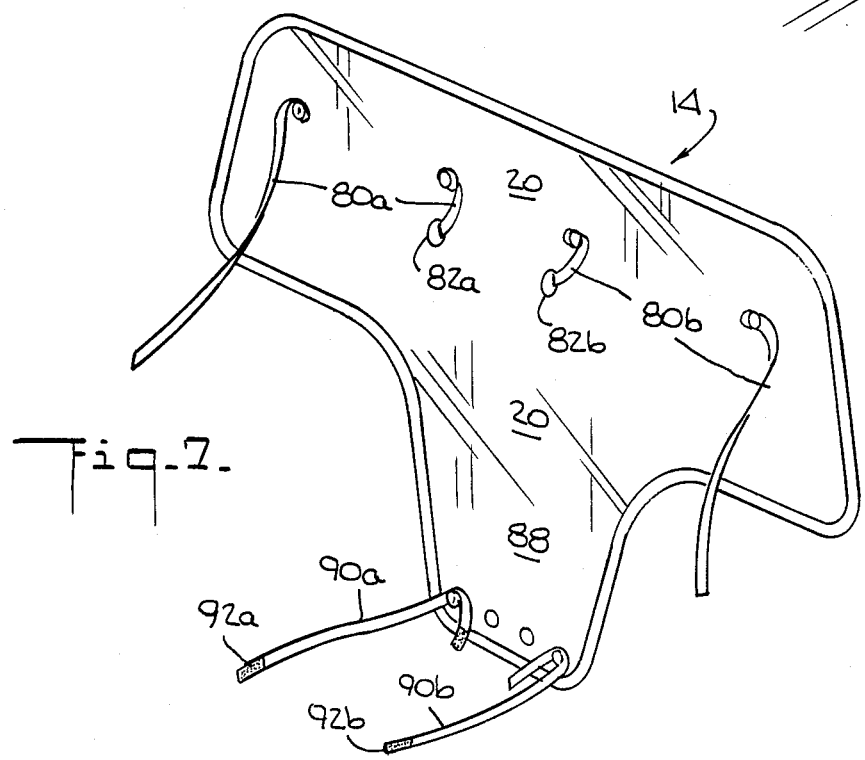
FIG. 7 is a perspective view of the windbreaker device of FIG. 6 of the present invention.

FIGS. 6-9 are perspective views illustrating, yet, another preferred embodiment of the windbreaker device of the present invention. In this embodiment, windbreaker 14 is detachably attached to a pair of bucket seats 12a, 12b, by means of straps or belts 80a, 80b, which encircle, though not enclose, the upper portions of bucket seats 12a, 12b, respectively. Such straps or belts may include a conventional belt buckle 82a, 82b, in order to permit an adjustability of the size of encirclement of straps or belts 80a, 80b. If a belt and belt buckle arrangement is employed in connection with the present invention, as illustrated in FIGS. 6 and 7, the two portions of each belt 80a, 80b, should, preferably, be of substantially different lengths so that the buckles 82a, 82b are located, when the windbreaker is attached to the headrest portions of bucket seats 12a, 12b, on an inner side 84a, 84b of seats 12a, 12b, or on an outer side 86a, 86b of such seats so that head of the passengers of the automobile are not capable of contacting the buckles of the invention. It should, of course, be recognized that, rather than a conventional belt and belt buckle, for use in connection with this embodiment of the invention, that an elastic strap, or other similar means, may also be employed for encircling the headrest portion of the bucket seats shown. Other means may also be employed for preventing any possible discomfort to passengers of the automobile from contact with the belt buckles of this embodiment.

It should be noted that the shape of windbreaker 14, as illustrated in FIGS. 6 and 7, is generally similar to the shape of the windbreaker in FIGS. 1-5. More particularly, the windbreaker embodiment illustrated in FIGS. 6-8 should preferably include a downwardly extending center portion 88 which would act to block winds from passing through the area between bucket seats 12a, 12b. This portion of the embodiment shown in FIGS. 6-8 would be analogous to feature 22 in FIGS. 1-5.

Figure 8:
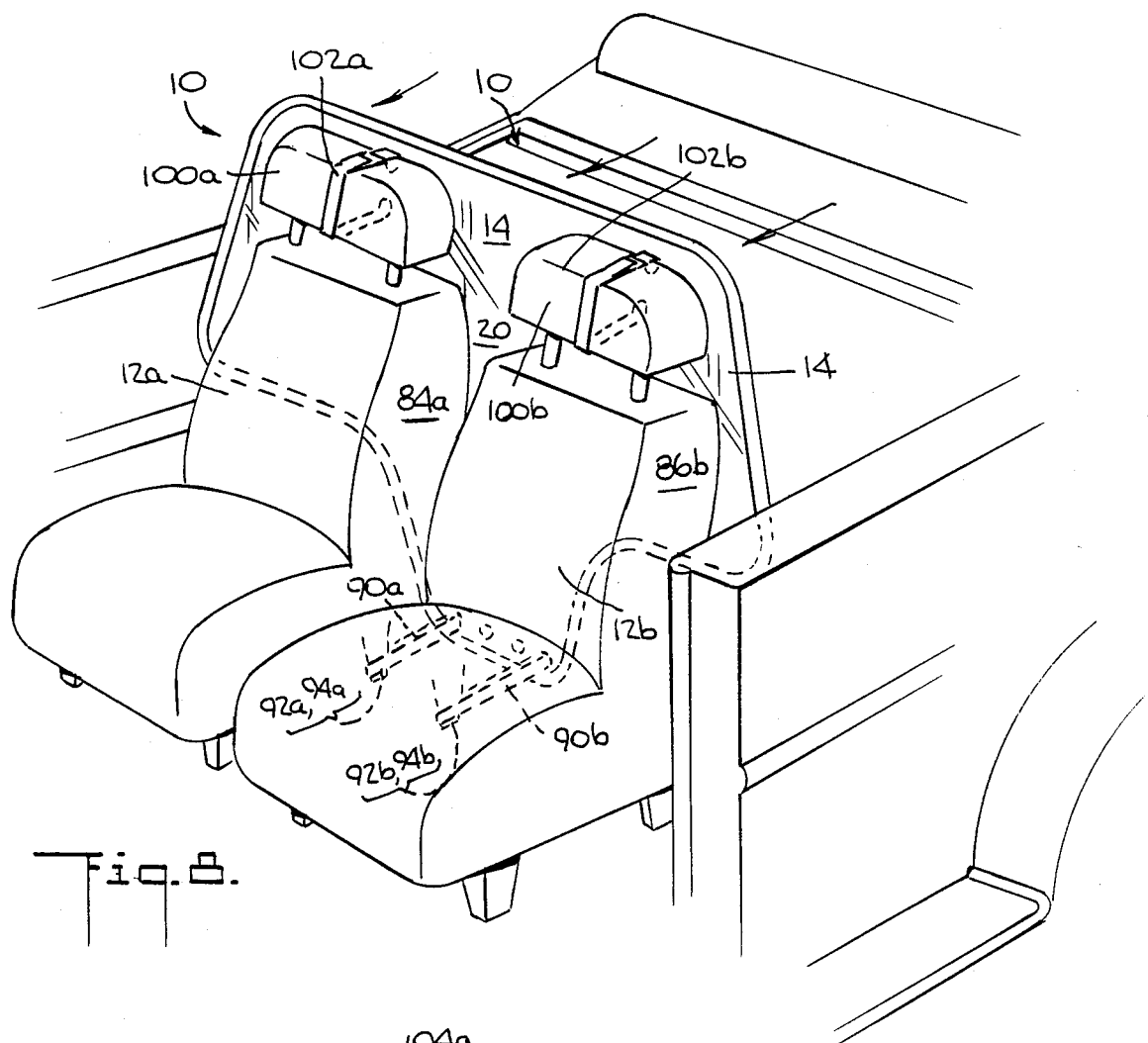
FIG. 8 is a perspective view of another alternative preferred embodiment of the present invention in relation to the front bucket seats of a convertible automobile wherein the bucket seats have separately attached headrests.

At substantially the bottom of central portion 88 of the embodiment shown in FIGS. 6-8, a series of straps, preferably two straps 90a, 90b, would extend from the windbreaker and would mate with a lower portion of each of the bucket seats 12a, 12b. Several means for such mating are possible including a belt buckle arrangement or, preferably, a hook-loop material (e.g., Velcro connection. Specifically, for the Velcro arrangement, each strap 90a, 90b would include, preferably at an end, one half of the cooperable mating means which comprises the Velcro, 92a, 92 b. The other mating portion of the Velcro mating means, 94a, 94b, is preferably attached (either permanently or temporarily) to an inner side of the bucket seats, 84a, 84 b, as best shown in FIGS. 6 and 8. Other means for attaching straps 90a, 90b to the bucket seats of the automobile are, of course, possible, and would be within the scope of the present invention.

FIG. 7 illustrates the windbreaker embodiment of FIG. 6, prior to attachment of the bucket seats of a convertible automobile.

Figure 9:
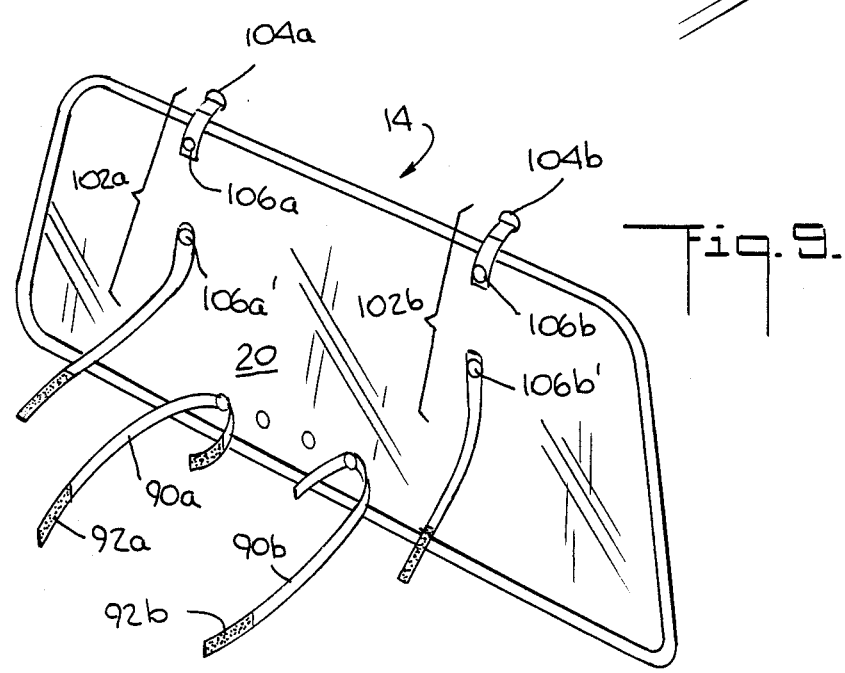
FIG. 9 is a perspective view of yet another embodiment of the windbreaker device of the present invention.

FIG. 8 illustrates an alternative embodiment of the embodiment of the present invention illustrated in FIGS. 6 and 7. The embodiment of FIG. 8 is substantially the same as that of FIGS. 6 and 7, except that the embodiment of FIG. 8 is designed for attachment to seats having separate and movable headrests 100a, 100b, relative to their respective seats. Specifically, the windbreaker of the present invention is preferably attached, in part, to each of the headrests of the automobile's seats. This is preferably accomplished by means of belt-and-buckle arrangement 102 a, 102b. The respective belt buckles are designated by the reference numerals 104a, 104b. As best illustrated in FIG. 9, straps 102a and 102b are substantially arranged vertically to one other, being attached to surface 20 of windbreaker 14 at points 106a, 106a', 106b'. By this verical arrangement, the belt-and-buckle arrangement of FIGS. 8 and 9 may easily encircle headrests 100a, 100b. Preferably, one portion of the belt-and-buckle arrangement shown should be shorter than the other portion so that the buckle portion of the arrangement would not rest in an area that may contact the head of a passenger, unless the buckle is otherwise modified or covered with a cushion to insure the passenger's comfort. When fastened, the belt-and-buckle arrangement of FIGS. 8 and 9 would vertically encircle the headrests 100a, 100b.

FIG. 9, additionally, presents an alternative embodiment of a possible shape of the windbreaker 14 of the present invention. In FIG. 9, surface 20 is shown as having a substantially trapezoidal shape which would be placed behind seats 12a, 12b, in a manner similar to the windbreaker embodiment of FIG. 8. In addition, while the embodiment present in FIG. 9 is designed by seats having separate and movable headrests, it may be re-designed for attachment to bucket seats in a manner similar to the embodiment shown in FIGS. 6 and 7.

It will be apparent to those skilled art worker that many modifications may be made in the design of the present invention. For example, the invention could be adapted for use in a convertible vehicle with a bench seat, rather than a pair of bucket seats. While in such an instance, the need for a center strip (22) would no longer exist, the embodiment including a halo would be particularly useful.

Additional alternative embodiments of FIGS. 6–9 would be the modification of such embodiments for use in connection with a bench seat. In the case of the embodiment of FIGS. 6 and 7, one strap arrangement (80, 82) may be used to encircle the entire upper portion of the bench seat in a manner similar to the individual encirclement of each separate bucket seat, as shown in FIGS. 6 and 7. In this modified embodiment, only one set of strap pieces would be necessary. The detachably attachable means of the invention (90, 92) would be placed immediately under the beach seat or on the automobile floor behind the bench seat, rather than on a side portion of a bucket seat.

With respect to the embodiment of FIGS. 8 and 9, for use with a bench seat having a separate, movable headrest, no modification would be necessary with respect to the strap portions of the device. Concerning the cooperable mating support means, for example, Velcro, of such a windbreaker device, inside of being removably attached to the inner side of bucket seats, such removably attachment may be placed on the backside of the bench seat, or on the floor of the automobile near, or under, the bench seat.

It should also be recognized that, especially with a bench seat, the strap means (90, 92) may also be placed on the outer sides of the bench seat near the doors of the automobile, rather than being centered beneath the bench seat or being centered behind the bench seat. Additional strap means (90, 92) may also be employed along various points of the invention as desired and appropriate for a secure hold of the windbreaker device of the invention.

Additional modifications are also encompassed within the scope of the present invention, for example, a halo (70) may also be employed in connection with the embodiments of the invention shown in FIGS. 6–9.

While only several embodiments of the present invention have been shown and described, it will be obvious to those skilled in the art that many modifications may be made there-unto without departing from the spirit and scope of the invention.

What is claimed is:

1. A windbreaker for a convertible automobile having bucket seats, comprising:
   a surface positionable to a back side of said bucket seats of said automobile, said surface extending across a space existing between said bucket seats for preventing a wind running from the rear of said automobile to the front of said automobile when said automobile is in motion; and
   means for securing and positioning said surface in said automobile to said back side of said bucket seats, said securing means including means for encircling an upper portion of at least a portion of one of said bucket seats with strap means.

2. The windbreaker device according to claim 1, wherein said surface includes a strip extending to substantially the floor of said automobile, said strip, at least partially, blocking the space existing between said bucket seats.

3. The windbreaker device according to claim 2, wherein said strip is attached to the floor of said automobile.

4. The windbreaker device according to claim 1, wherein said surface is made of a rigid material.

5. The windbreaker device according to claim 1, wherein said surface is made of a plastic material.

6. The windbreaker device according to claim 1, wherein said means for securing and positioning said surface is carried out by providing said surface with said strap means which include at least one flexible strap which is capable of being fitted over at least one headrest portion of at least one bucket seat.

7. The windbreaker device according to claim 6, wherein said flexible strap is made of an elastic material.

8. The windbreaker device according to claim 6, wherein said strap means includes one of said flexible straps for each headrest portion of two of said bucket seats of said automobile.

9. The windbreaker device according to claim 6, wherein said strap means encircles said headrest of said bucket seat in a substantially horizontal positioning.

10. The windbreaker device according to claim 6, wherein said strap means encircles said headrest of said bucket seat in a substantially vertical positioning.

11. The windbreaker device accordiang to claim 6, wherein said strap means includes two flexible straps with each of said flexible straps encircling a separate, moveable headrest for each of two of said bucket seats in a substantially vertical positioning.

12. The windbreaker device according to claim 1, wherein said strap means comprises a belt-and-buckle arrangement.

13. The windbreaker device according to claim 1, wherein said strap means includes a hook-and-loop material as a means for detachable attachment of said strap means.

14. The windbreaker device according to claim 1, further comprising a second means for securing and positioning said surface, said second means for securing and positioning being including second strap means at a portion of said surface.

15. The windbreaker device according to claim 14, wherein said second strap means at said portion of said surface includes a hook-and-loop material wherein complementary portions of said hook-and-loop material are located on said second strap means and on at least one of said bucket seats.

16. the windbreaker device according to claim 15, wherein said second strap means includes two strap, each with said hook-and-loop material, with said complementary portions of said hook-and-loop material being located on an inner side portion of each of two of said bucket seats.

17. The windbreaker device according to claim 15, wherein said second strap means includes two strap, each with said hook-and-loop material, with said complementary portions of said hook-and-loop material being located on an outer side portion of each of two of said bucket seats.

18. The windbreaker device according to claim 1, wherein said surface extends outward beyond said bucket seats of said automobile to increase a wind resisting effect of said windbreaker.

19. The windbreaker device according to claim 1, further comprising an outwardly-extending panel which borders and extends from said surface to increase a wind resisting effect of said windbreaker.

20. A windbreaker for a convertible automobile having a bench seat, comprising:
   a surface positionable to a back side of said bench seat, said surface being rigid and extending outwardly beyond the perimeter of said bench seat of said automobile so that a wind is prevented from running from the rear of said automobile to the front of said automobile when said automobile is in motion; and
   means for securing and positioning said surface in said automobile to said back side of said bench seats, said securing means including means for encircling an upper portion of a portion of said bench seat with strap means.

21. The windbreaker device according to claim 20, wherein said means for securing and positioning of said surface is carried out with strap means which include a strip of a material capable of encircling a portion of said bench seat.

22. The windbreaker device according to claim 21, wherein said strip is made of a flexible material.

23. The windbreaker device according to claim 21, wherein said strip is made of an elastic material.

24. The windbreaker device according to claim 21, wherein said strip of said material encircles a headrest portion of said bench seat.

25. the windbreaker device according to claim 21, further comprising second strap means utilizing at least one strap detachably attached to said bench seat.

26. The windbreaker device according to claim 25, wherein said second strap means includes the attachment of a strip of material via a hook-and-loop material.

27. The windbreaker device according to claim 25, wherein said second strap means at said portion of said surface includes a hook-and-loop material wherein complementary portions of said hook-and-loop material are located on said second strap means and on at least one of said bench seat.

28. The windbreaker device according to claim 20, wherein said strap means includes the attachment of a strip of material via a belt-and-buckle arrangement.

29. The windbreaker device according to claim 20, wherein said strap means includes the attachment of a strip of material via a hook-and-loop material.

* * * * *